US007587665B2

(12) United States Patent
Crow et al.

(10) Patent No.: US 7,587,665 B2
(45) Date of Patent: Sep. 8, 2009

(54) METHOD AND COMPUTER-READABLE MEDIUM FOR PROVIDING SPREADSHEET-DRIVEN KEY PERFORMANCE INDICATORS

(75) Inventors: Howard M. Crow, Sammamish, WA (US); Andrew E. Datars, Duvall, WA (US); Eran Megiddo, Bellevue, WA (US); Alfred Fai Hang Wong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 11/080,165

(22) Filed: Mar. 15, 2005

(65) Prior Publication Data

US 2006/0212791 A1    Sep. 21, 2006

(51) Int. Cl.
G06F 17/00  (2006.01)

(52) U.S. Cl. ............................................. 715/212

(58) Field of Classification Search ................. 715/212, 715/219, 220
See application file for complete search history.

(56) References Cited

U.S. PATENT DOCUMENTS

| 5,893,123 | A  |   | 4/1999  | Tuinenga ................... 707/504 |
| 6,057,837 | A  | * | 5/2000  | Hatakeda et al. ............. 715/765 |
| 6,691,100 | B1 |   | 2/2004  | Dector et al. .................. 707/2 |
| 7,349,862 | B2 | * | 3/2008  | Palmer et al. ................... 705/7 |
| 2002/0099578 | A1 |   | 7/2002  | Eicher, Jr. et al. .............. 705/7 |
| 2003/0187523 | A1 | * | 10/2003 | Smith et al. ................... 700/83 |
| 2004/0237045 | A1 | * | 11/2004 | Meltzer ....................... 715/530 |
| 2004/0250255 | A1 | * | 12/2004 | Kraiss et al. ................. 719/310 |
| 2004/0254806 | A1 | * | 12/2004 | Schwerin-Wenzel et al. ... 705/1 |
| 2005/0060219 | A1 | * | 3/2005  | Deitering et al. .............. 705/10 |
| 2005/0065952 | A1 | * | 3/2005  | Dettinger et al. ............. 707/101 |
| 2005/0216831 | A1 | * | 9/2005  | Guzik et al. ................. 715/513 |

(Continued)

FOREIGN PATENT DOCUMENTS

CA    2199921    3/1994

(Continued)

OTHER PUBLICATIONS

Ferrin et al., Electronic Workflow for Transaction-based Work Cells in a Financial Services Firm, Proceeding of the 2000 Winter Simulation Conference, Google 2000, pp. 2055-2058.*

(Continued)

*Primary Examiner*—Cong-Lac Huynh
(74) *Attorney, Agent, or Firm*—Merchant & Gould

(57) ABSTRACT

A method, system, apparatus, and computer-readable medium for providing spreadsheet-driven key performance indicators are disclosed. According to the method, a spreadsheet-driven key performance indicator is created that includes a location of a spreadsheet, a location of a cell within the spreadsheet to be utilized as an indicator value, and a goal value. The key performance indicator may be evaluated by retrieving the indicator value from cell of the spreadsheet, comparing the indicator value to the goal value, and providing a visual indication based on the result of the comparison. The goal value may also be expressed as a location within a spreadsheet. The spreadsheet locations may contain references to databases containing the data that should be utilized as the indicator and goal values. A warning value may also be specified, compared to the indicator, and a visual indication may be provided based upon the result of the comparison.

19 Claims, 7 Drawing Sheets

U.S. PATENT DOCUMENTS

| | | | |
|---|---|---|---|
| 2005/0278291 A1* | 12/2005 | Barrette et al. | 707/1 |
| 2006/0015804 A1* | 1/2006 | Barton et al. | 715/503 |
| 2006/0095276 A1* | 5/2006 | Axelrod et al. | 705/1 |
| 2006/0095417 A1* | 5/2006 | Chender et al. | 707/3 |
| 2006/0161471 A1* | 7/2006 | Hulen et al. | 705/10 |
| 2006/0191993 A1* | 8/2006 | Markham et al. | 235/376 |
| 2006/0282818 A1* | 12/2006 | DeSpain | 717/109 |
| 2006/0288267 A1* | 12/2006 | DeSpain | 715/503 |
| 2007/0006089 A1* | 1/2007 | Bales et al. | 715/769 |
| 2007/0050237 A1* | 3/2007 | Tien et al. | 705/11 |
| 2007/0061698 A1* | 3/2007 | Megiddo et al. | 715/503 |
| 2007/0136666 A1* | 6/2007 | Khen et al. | 715/538 |
| 2007/0150389 A1* | 6/2007 | Aamodt et al. | 705/35 |
| 2008/0028288 A1* | 1/2008 | Vayssiere et al. | 715/219 |

FOREIGN PATENT DOCUMENTS

| | | |
|---|---|---|
| CN | 1147308 A | 4/1997 |

OTHER PUBLICATIONS

Gane et al., A Balanced Scorecard, Google Jun. 2002, pp. 123-127.*

Mian et al., Construction Projects Immediate Health Check: A CSF & KPI Approach, Google Aug. 2004, pp. 1-13.*

Ferrin et al., Electronic Workflow for Transaction-Based Work Cells in a Financial Services Firm, Google 2000, p. 2055-2058.*

Kim et al., Development of a Housing Performance Evaluation Model for Multi-family Residental Buildings in Korea, Google 2004, pp. 1103-1116.*

Ugwu et al., Key Performance Indicators and Assessment for Infrastructure Sustainability—A South African Construction Industry Perspective, Google 2005, pp. 665-680.*

Swan et al., An Introduction to Key Performance Indicators, Google Nov. 2004, pp. 1-22.*

European Communication & Search Report dated Dec. 9, 2008 cited in Application No. 06111099.5 0 1527 / 1703416.

Jonathan J. Cadiz et al., "The Awareness Monitor: A Coordination Tool for Asynchronous, Distributed Work Teams," Microsoft Research—Online Publication, Sep. 29, 2000, Retrieved from the Internet: http://web.archive.org/web/20000929040940/http://research.microsoft.com/{jjcadiz/awareness_monitor.pdf>, 8 pgs.

Daniel J. Power et al., "Building Web-based Decision Support Systems," Studies in Informatics and Control Institutul de Cerceta/RIIN Informatica, Bucharest, RO, vol. 11, No. 4, Dec. 1, 2002, pp. 291-301.

Anonymous author, "Addix.Selector Overview," Web Archive Webpage, Oct. 24, 2003, XP-002507323, Retrieved from the Internet: http://web archive org/web/20031024083553/http://www.addix.com/products /selector/overview.html>, 1 pg.

Chinese First Office Action dated Jan. 16, 2009 cited in Application No. 200610008817.9.

Kuan Tao, "How to Establish the System of Key Achievements Index," Human Resource Development of China, Issue 2, 2002, 4 pgs.

* cited by examiner

METHOD AND COMPUTER-READABLE MEDIUM FOR PROVIDING SPREADSHEET-DRIVEN KEY PERFORMANCE INDICATORS

BACKGROUND OF THE INVENTION

Key performance indicators (also referred to herein as "KPIs" or "indicators") help organizations define and measure progress toward organizational goals. In particular, KPIs are quantifiable measurements that reflect progress toward an agreed-upon numerical goal. KPIs can differ significantly based upon the organization. For instance, a business may have as one of its KPIs the percentage of income that comes from repeat customers. A customer service department within the business may have as one of its KPIs the percentage of customer telephone calls that are answered within the first minute. Other types of organizations, and groups within those organizations, may define and utilize other types of KPIs.

In order to make KPIs accessible to executives and other employees of an organization, software components are typically constructed that extract the required data from complex databases, evaluate the KPI, and present the results in the form of a balanced scorecard that shows the values of one or more KPIs. Creation of these types of complex software components requires programming skills beyond those of the average computer user. Therefore, it is typically necessary to utilize the services of a professional programmer, which can be very expensive. Moreover, data that is created in applications utilized by many computer users has not been previously available for use in KPIs. For instance, although millions of users utilize spreadsheet application programs for a wide range of financial and business purposes, the data created and stored in spreadsheets has been previously unavailable for use within KPIs.

It is with respect to these considerations and others that the various embodiments of the present invention have been made.

BRIEF SUMMARY OF THE INVENTION

In accordance with the present invention, the above and other problems are solved by a method, system, apparatus, and computer-readable medium for providing spreadsheet-based key performance indicators. Through the use of the embodiments of the invention, computer users familiar only with a web browser application program and a spreadsheet application program can create KPIs that incorporate data from common sources, such as spreadsheets. The KPIs can then be evaluated utilizing the data from the spreadsheet and viewed by users utilizing a web browser application program.

According to one embodiment of the invention, a method is provided for creating and evaluating spreadsheet-based KPIs. According to the method, a user interface is provided for easily creating a spreadsheet-driven KPI. Through the user interface, a user can provide the location of a spreadsheet, the location of a cell within the spreadsheet to be utilized as an indicator value for the KPI, and a goal value. The goal value may be specified as a value or as the location of a cell within the same or another spreadsheet. The user may also be permitted to provide a warning value or the location of a cell within a spreadsheet to be utilized as the warning value. Once the user has provided this information, a KPI definition may be saved that includes the data.

In order to evaluate the defined KPI, the indicator value is retrieved from the defined spreadsheet cell. In order to perform this process, the spreadsheet is loaded and calculated. It should be appreciated that the spreadsheet cell may refer to other external data sources, such as a database. If the user specified values for the goal and warning values, these numbers are utilized directly. If the user specified spreadsheet cells for the goal and warning values, the spreadsheets containing the cells are loaded, calculated, and the appropriate values are retrieved, including querying an external database if specified.

Once the indicator value, goal value, and warning value have been obtained, the KPI is evaluated by comparing the indicator value to the goal and warning values. A visual indicator is then displayed based on the results of the comparison. In particular, one visual indicator may be displayed if the goal value is greater than the indicator value and another visual indicator may be displayed if the goal value is less than or equal to the indicator value. Similarly, one visual indicator may be displayed if the warning value is greater than the indicator value and another visual indicator may be displayed if the warning value is less than or equal to the indicator value. The visual icon may comprise a computer icon, a text message, or other type of visual or audible indicator configured to indicate that the goal and warning values are less than, greater than, or equal to the goal value.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIGS. 3-5 are screen diagrams illustrating display screens provided by the various aspects of the invention.

DETAILED DESCRIPTION OF THE INVENTION

Figure 1:
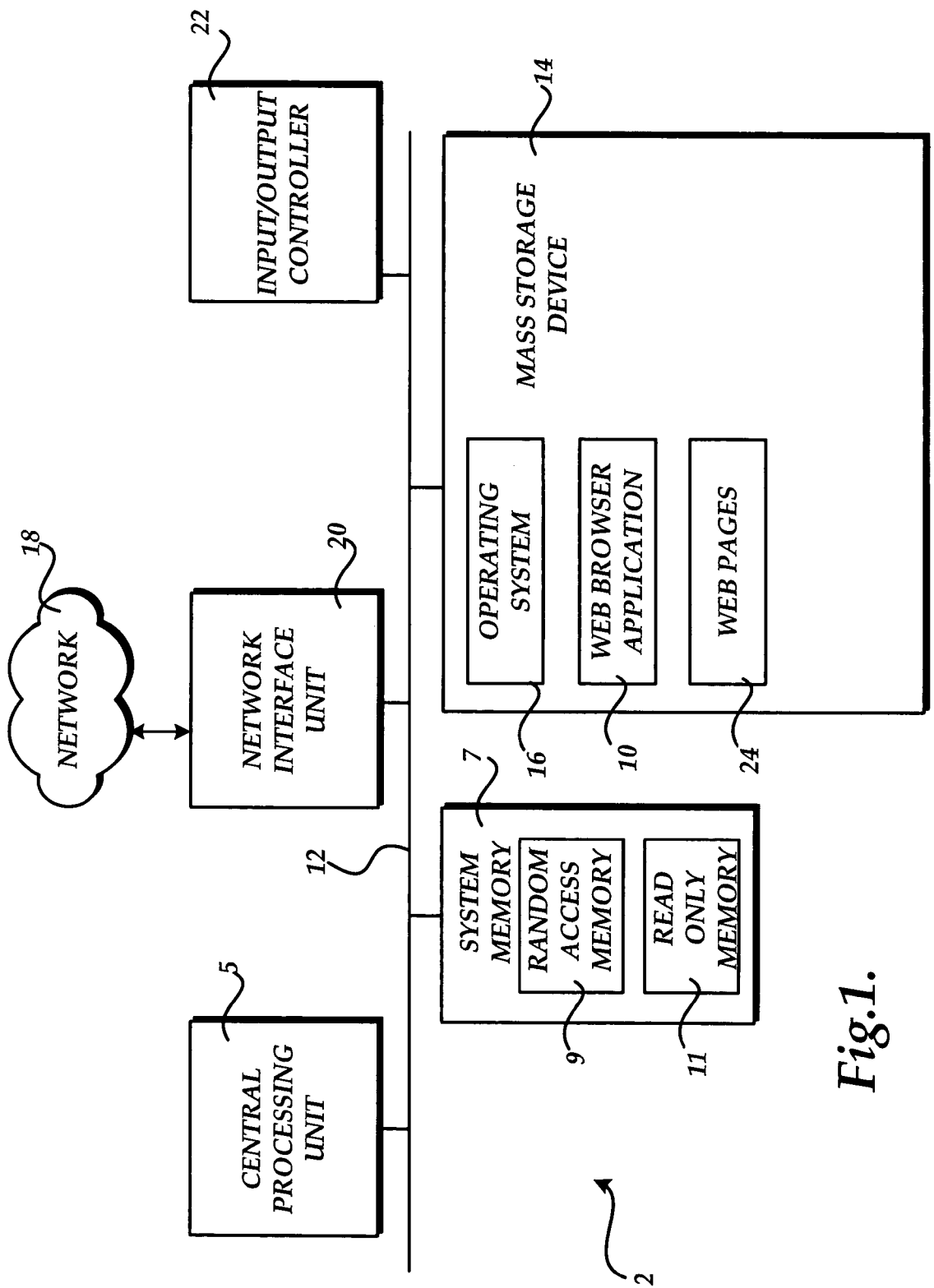
FIG. 1 is a computer system architecture diagram illustrating a computer system provided by and utilized in the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on server and personal computer systems, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a web browser application program 10. As known to those skilled in the art, the web browser application program 10 is operative to request, receive, render, and provide interactivity with electronic documents, such as the web pages 24 that have been formatted for use with the web browser 10. Moreover, the web browser application program 10 may be operative to execute scripts contained in the web pages 24, such as scripts expressed utilizing the JAVASCRIPT language from SUN MICROSYSTEMS, INC. According to one embodiment of the invention, the web browser application program 10 comprises the INTERNET EXPLORER web browser application program from MICROSOFT CORPORATION. It should be appreciated, however, that other web browser application programs from other manufacturers may be utilized to embody the various aspects of the present invention, such as the FIREFOX web browser application from the MOZILLA FOUNDATION.

As will be described in greater detail below, the web pages 24 may comprise pages for creating and viewing KPIs. In particular, the web pages 24 may include HTML and scripts which, when displayed by the web browser application 10, provide a user interface for creating spreadsheet-based KPIs and for displaying spreadsheet-based KPIs. Additional details will be provided below regarding the format, construction, and use of the web pages 24.

Figure 2:
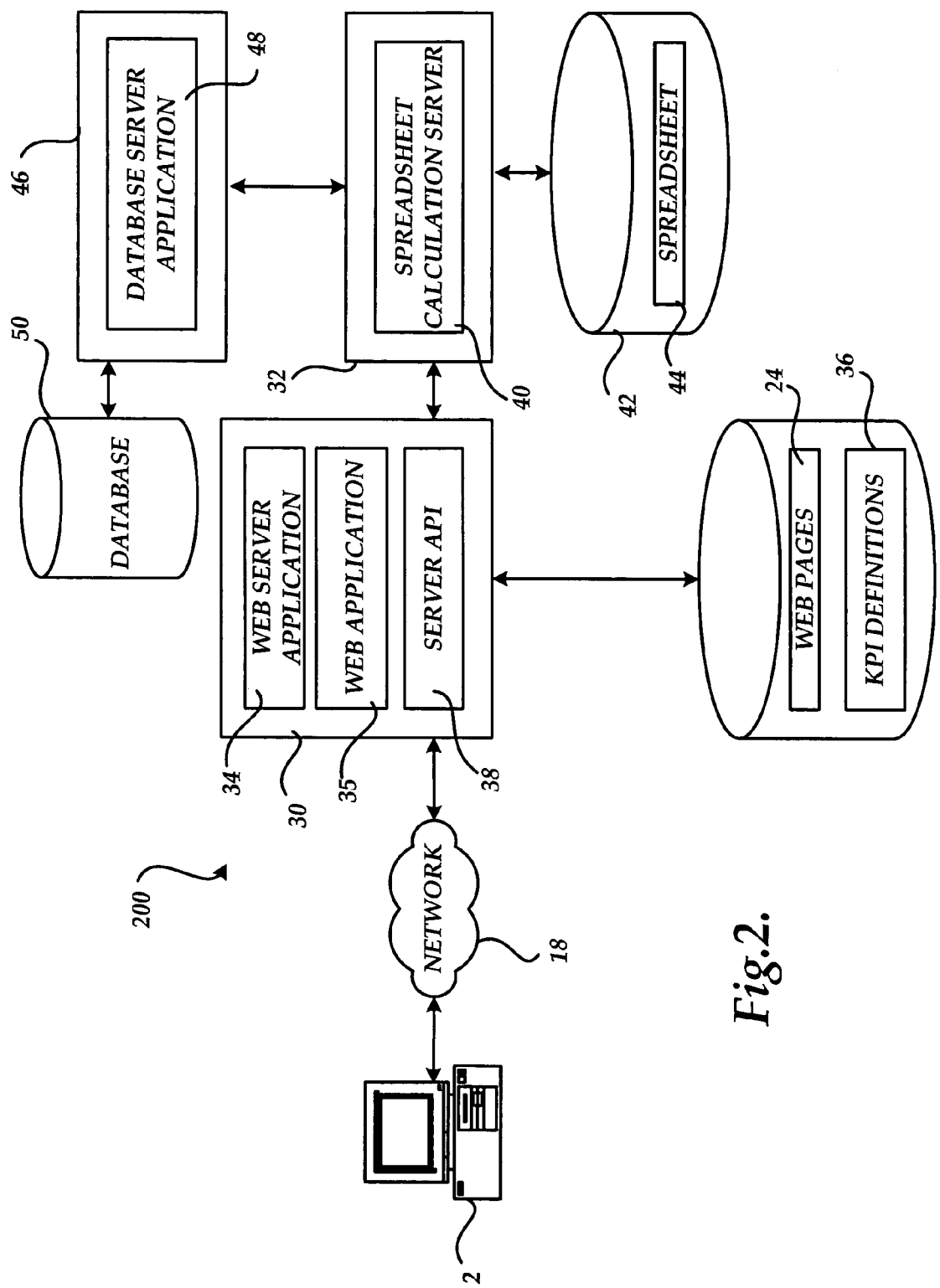
FIG. 2 is a network architecture diagram illustrating an illustrative operating environment for embodiments of the invention.

Referring now to FIG. 2, a network architecture diagram will be described that illustrates an operating environment 200 for the various embodiments of the invention. As shown in FIG. 2, the computer 2 is connected to a network 18. Also connected to the network 18 is a web server computer 30. The web server 30 comprises a server computer which may contain some or all the conventional computing components described above with respect to FIG. 1. Additionally, the web server computer 30 is operative to execute a web server application 34 for receiving and responding to requests for documents stored at or accessible to the web server computer 30. Moreover, the web server 30 is operative to receive and respond to requests for web pages 24 generated by a web application 35. It should be appreciated that the web application 35 may comprise code executable at the web server 30, executable code for communicating with other computers, and may include templates, graphics, audio files, and other content known to those skilled in the art.

According to one aspect of the invention, the web application 35 is operative to provide an interface to a user of the computer 2 to create spreadsheet-based KPIs and to view pages showing the results of evaluated KPIs. In particular, the web application 35 may receive a request from the client computer 2 to create a new spreadsheet-based KPI. In response to the request, the web application 35 will return a web page 24 containing fields for creating a new spreadsheet-based KPI. An illustrative web page 24 for creating a new KPI will be described below with respect to FIGS. 3 and 4. Once the user has provided the information necessary to create a new KPI, a KPI definition 36 may be stored with the provided information. As will be described in greater detail below, the KPI definition is utilized when the KPI is evaluated.

A user of the computer 2 may also request to view a balanced dashboard including one or more KPIs. When such a request is received, the web application 35 retrieves the appropriate KPI definitions 36 and evaluates the KPIs. In order to evaluate the KPI, the web application 35 utilizes a server application programming interface ("API") 38. The server API 38 is operative to enable communication with a spreadsheet calculation server computer 32. The spreadsheet calculation server computer 32 is operative to execute a spreadsheet calculation server program 40. The spreadsheet calculation server program 40 comprises an executable program for retrieving and calculating spreadsheets such as the spreadsheet 44 stored in the database 42. It should be appreciated that in the embodiments of the invention described herein, the spreadsheet calculation server program 40 comprises the EXCEL CALCULATION SERVER program from MICROSOFT CORPORATION. However, other programs for calculating a spreadsheet on a server computer may be utilized. It should also be appreciated that the calculation server computer 32 may include many of the conventional hardware and software components discussed above with respect to FIG. 1.

It should be appreciated that the cells of the spreadsheet 44 may contain references to external data sources, such as a database. In particular, one or more of the cells of the spreadsheet 44 may contain a reference to a database 50 connected to a database server computer 46. In order to retrieve the data referenced by such a spreadsheet cell, the spreadsheet calculation server 40 may transmit a request for the data to a database server application 48 executing on the database server computer 46. The database server application 48 is then operative to retrieve the requested data from the database 50 and return the data to the spreadsheet calculation server 40. It should also be appreciated that the particular data returned by both the spreadsheet calculation server 40 and the database server application 48 is dependent upon the credentials supplied by the user of the computer 2. As a result, the value of a KPI may also be different depending upon the particular user and their credentials.

Figure 3:
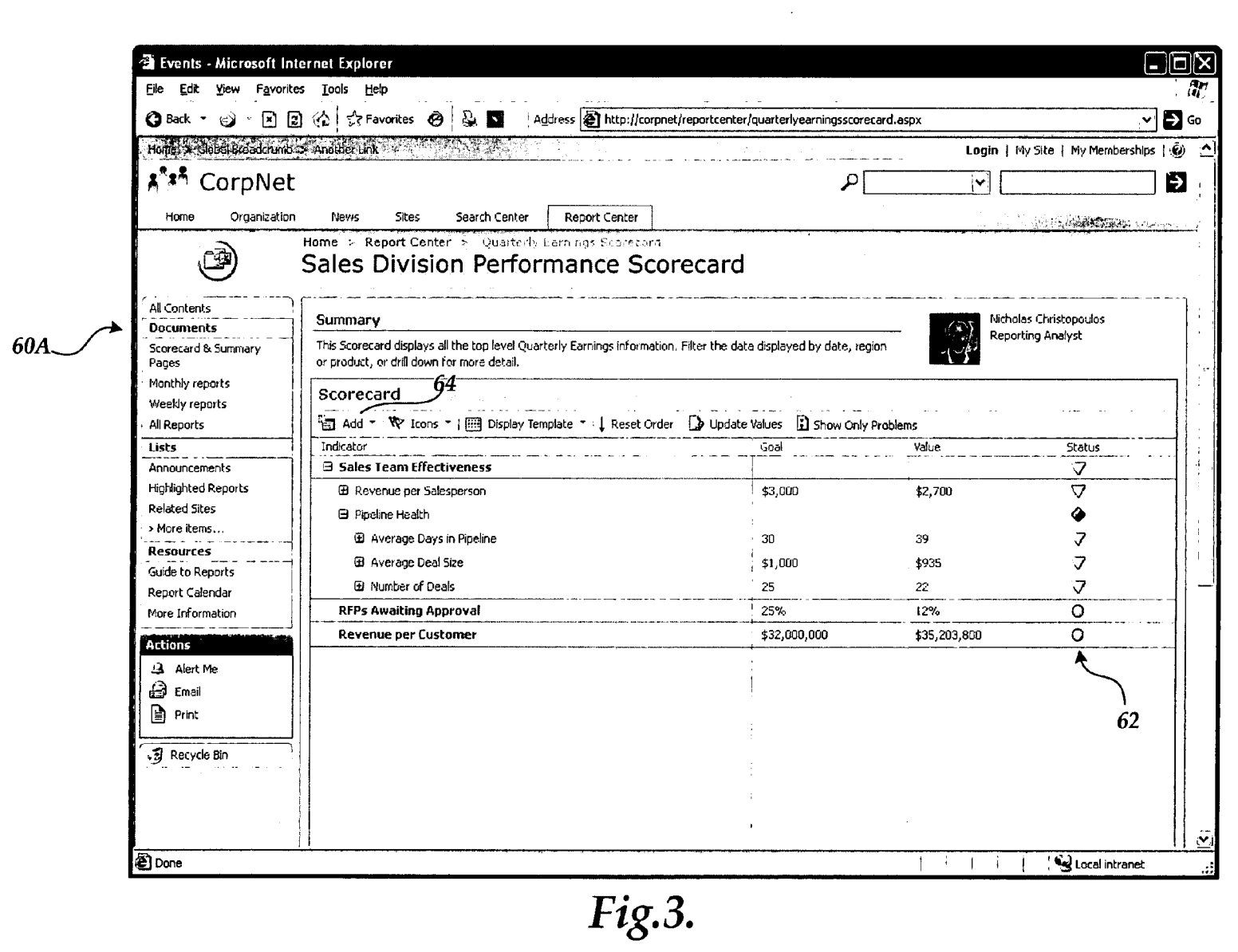

Referring now to FIG. 3, an illustrative screen display 60A provided by an embodiment of the invention will be described. In particular, FIG. 3 shows several KPIs generated by one embodiment of the invention along with user interface items for editing the KPIs, for adding additional KPIs to the list, and for performing other functions. As shown in FIG. 3, each KPI includes a visual indicator 62 and explanatory text for each KPI. The text identifies each KPI and the goal and indicator values for each KPI. Both the goal value and the indicator value may be retrieved from a spreadsheet.

The visual indicators 62 provide a quick indication of the relationship between the goal and indicator values and may comprise any type of computer icon, text, or other type of visual indicator from which the relationship between the goal and indicator values may be quickly determined. For instance, the visual indicator 62 for a KPI may be displayed in one color if the goal value is greater than the indicator value (green, for instance) and another color if the goal value is less than the indicator value (red, for instance). Alternatively, different icons may be utilized if the goal value is less than or greater than the indicator value. As will be described in greater detail below, a warning value may also be specified. The visual indicator 62 for a particular KPI may also be displayed differently depending upon whether the indicator value is less than, greater than, or equal to the warning value.

As shown in FIG. 3, user interface objects are provided for editing a KPI and for adding new KPIs to the list. In particular, the button 64 allows a user to create a new KPI or edit the parameters for an existing KPI. An illustrative user interface will be described below with respect to FIGS. 4-5 for adding a new KPI. Additional details regarding the definition, evaluation, and selection of the appropriate visual indicator are described below with reference to FIGS. 4-7.

Figure 4:
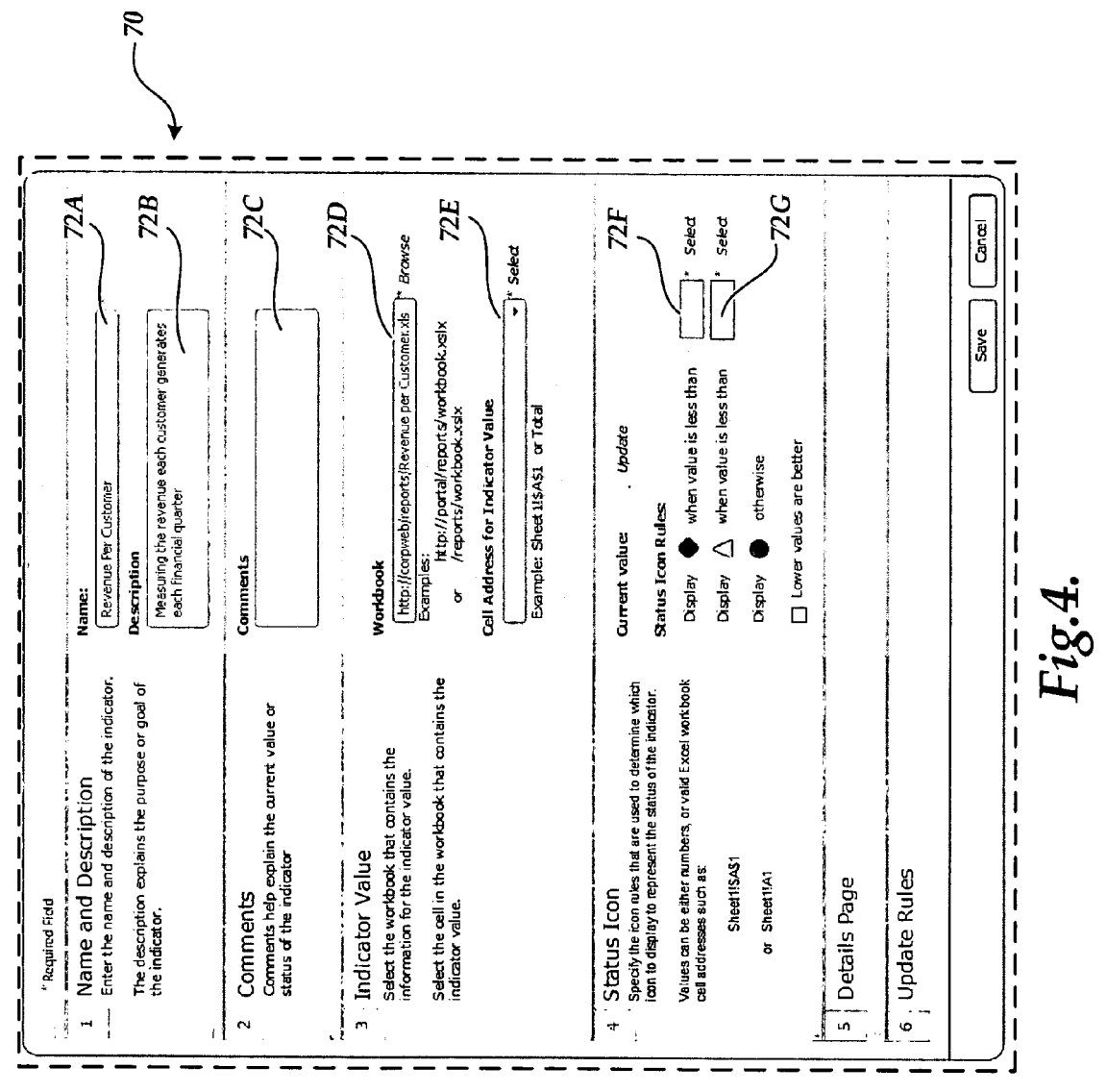

Referring now to FIG. 4, an illustrative user interface 70 will be described for creating a new spreadsheet-based KPI. The user interface 70 is displayed in response to the selection of the button 64 shown in FIG. 3. As illustrated in FIG. 4, a number of fields are provided through which a user can enter information related to the new indicator. In particular, the field 72A is utilized for providing a name for the new indicator and the field 72B is utilized to provide a description for the new indicator that indicates the purpose or goal of the indicator. The field 72C may be utilized to provide comments for the new indicator that help explain the current value or status of the indicator.

Figure 5:
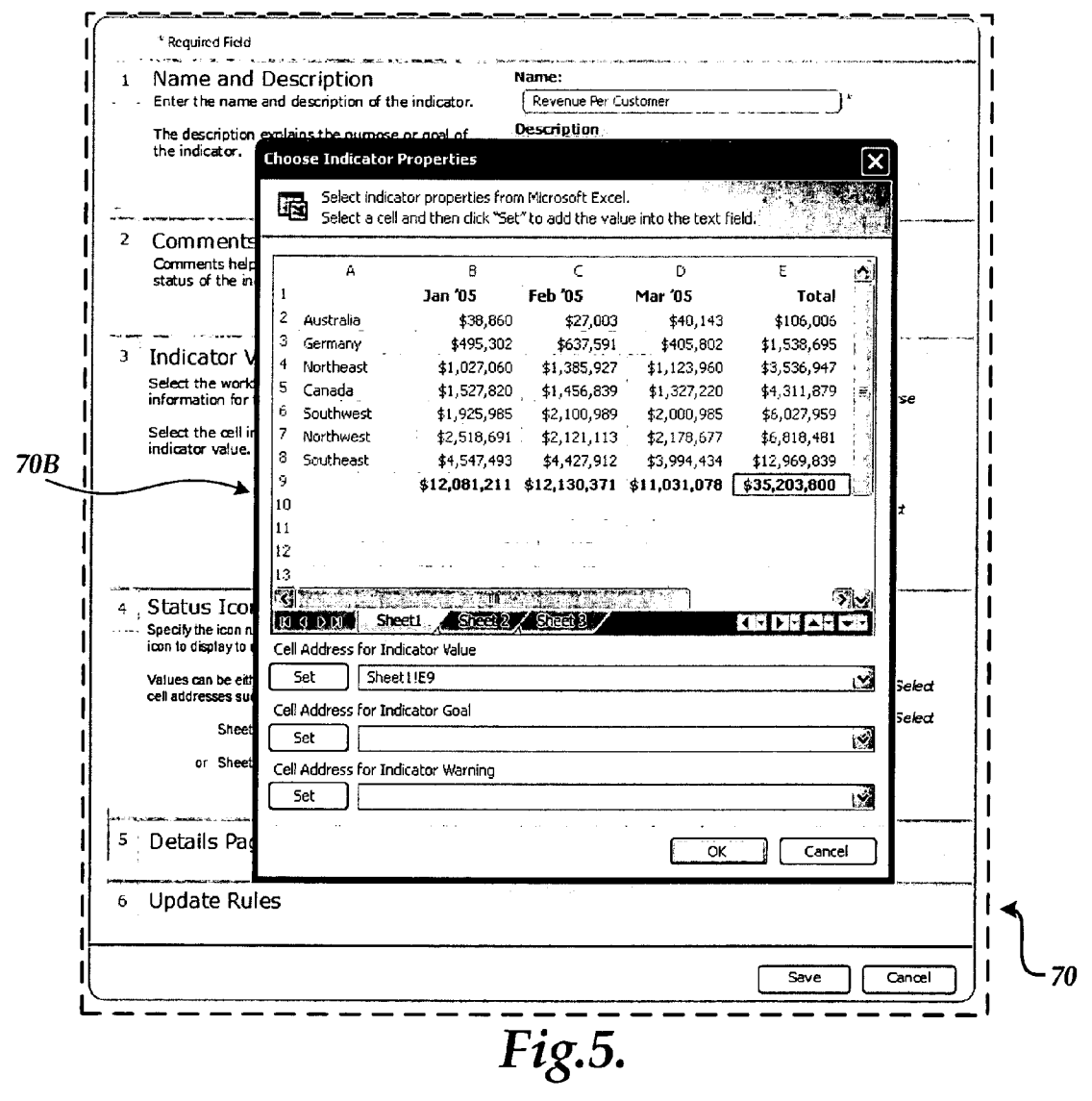

In the field 72D, the user provides the location of a spreadsheet (also referred to as a "workbook") to be utilized to retrieve the indicator value. In the field 72E, a cell address is provided that indicates the cell within the spreadsheet identified in the field 72D from which the indicator value should be retrieved. In the fields 72F and 72G, the user specifies values for the goal value and the warning value, respectively. Alternatively, the fields 72F and 72G may be utilized to specify cell addresses within the spreadsheet from which the goal and warning values should be retrieved. According to one embodiment, the user may be provided with a user interface for visually selecting the cells from a spreadsheet to be utilized as the goal, warning, and indicator values. An illustrative user interface 70B for performing this function is shown in FIG. 5. The user may also specify whether the new indicator should be calculated once only or should be calculated each time a user views the list of indicators. Once the user has provided all of the required information, the KPI may be saved by the web application 35 as a KPI definition 36.

Figure 6:
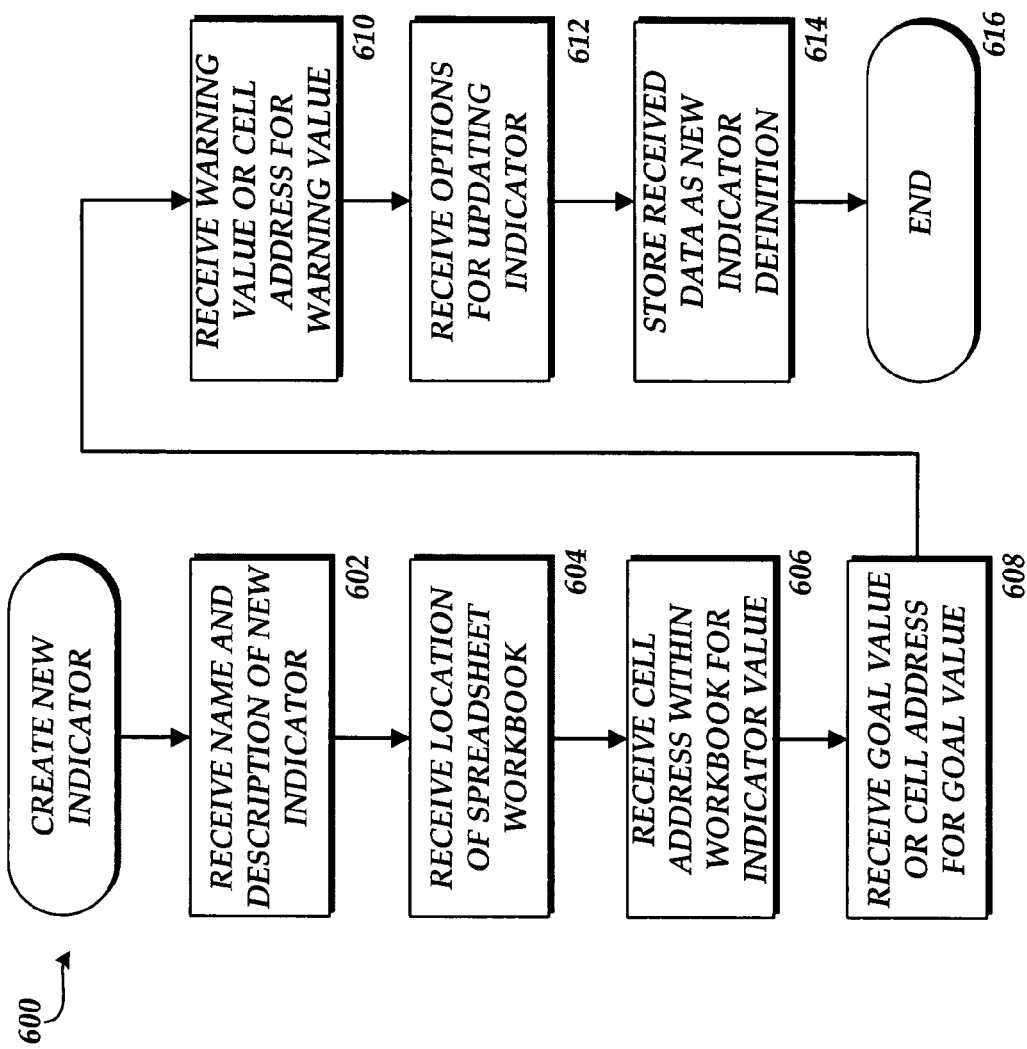
FIGS. 6-7 are process diagrams showing aspects of an illustrative process for providing spreadsheet-based key performance indicators.

Referring now to FIG. 6, an illustrative routine 600 will be described illustrating a process for creating a new spreadsheet-based KPI. It should be appreciated that although the embodiments of the invention described herein are presented in the context of a web browser application program, the invention may be utilized in other types of application programs.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 6 and 7, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where the web server computer 30 receives the name and the description of the new indicator. As described above with respect to FIG. 4, this information may be provided in the fields 72A and 72B, respectively. The routine 600 then continues to operation 604, where the web server computer 30 receives the location of the spreadsheet from which the indicator value should be retrieved. This information is provided in the field 72C. The routine 600 then continues to operation 606, where the web server computer 30 receives the cell address within the spreadsheet for the indicator value. This information is provided in the field 72D. From operation 606, the routine 600 continues to operation 608.

At operation 608, the web server computer receives a numerical value for the goal value or a cell address within the spreadsheet from which the goal value should be retrieved. This information may be provided in the fields 72E or 72G, respectively. The routine 600 then continues to operation 612, where a numerical value for the warning value or a cell address within the spreadsheet from which the warning value should be retrieved. This information may be provided in the fields 72F or 72H, respectively. The routine 600 then continues to operation 612, where the user may specify options regarding whether the KPI should be calculated only once or each time a request is made to view the KPI. The routine 600 then continues to operation 614 where the data received at operations 602-612 is stored as a KPI definition 36. The routine 600 then continues to operation 616, where it ends.

Figure 7:
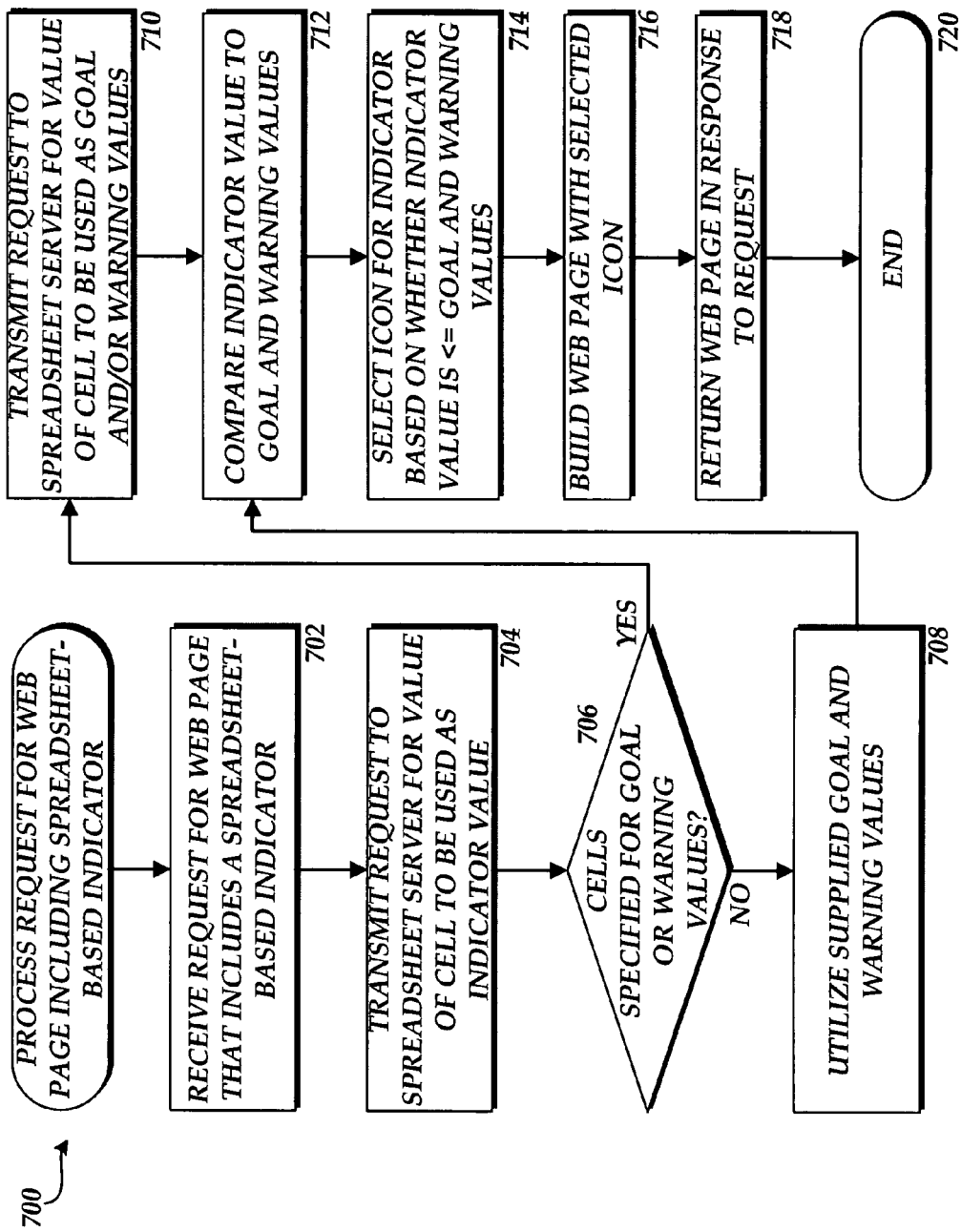

Turning now to FIG. 7, an illustrative routine 700 will be described for processing a request from the computer 2 for a web page 24 that includes a spreadsheet-based KPI. The routine 700 begins at operation 702, where the web server computer 30 receives a request for a web page 24 that includes a spreadsheet-based indicator, such as the page described above with respect to FIG. 5. In response to the request, the web server computer 30 retrieves the KPI definition 36 corresponding to each of the indicators on the page. The routine 700 then continues to operation 704, where the web server computer 30 transmits a request to the spreadsheet calculation server 40 for the value of the cell in the spreadsheet 44 that is to be utilized as the indicator value. In response to the request, the spreadsheet calculation server 40 loads and recalculates the spreadsheet 44. This may include retrieving data from the database server application 48 if the spreadsheet 44 references external data contained in the database 50. The spreadsheet calculation server 40 then returns the calculated indicator value to the web server computer 30.

From operation 704, the routine 700 continues to operation 706, where the web server computer 30 determines if the goal and warning values were expressed as cell references. If the goal and warning values were not expressed as cell references, the routine 700 continues to operation 708, where the goal and warning values are retrieved from the KPI definition 36. If the goal and warning values were expressed as cell references, the routine 700 continues to operation 710, where a query is transmitted to the spreadsheet calculation server 40 for the values of the cells specified for the goal and warning values. In response to the request, the spreadsheet calculation server 40 returns the values of the identified cells. The routine 700 then continues from operations 708 and 710 to operation 712.

At operation 712, the web server computer 30 compares the indicator value to the goal value and the warning value to determine whether the indicator value is greater than, less than, or equal to the goal and warning values. Once the comparison has been made, the routine 700 continues to operation 714, where the visual indicator for the KPI is selected based upon whether the indicator value is less than, greater than, or equal to the goal and warning values. The routine 700 then continues to operation 716, where a web page is created with the selected visual indicator, such as the web page described above with reference to FIG. 5. The routine 700 then continues to operation 718, where the web page is returned to the client computer 2 in response to the initial request to view the KPI. The routine 700 then continues to operation 720, where it ends.

It should be appreciated that, according to embodiments of the invention, any number of values may be specified and compared to the indicator value. Additionally, any number of different visual or audible indicators may be provided to indicate the relationship between the specified values and the indicator value. In this manner, any level of granularity may be provided for comparing the value of the indicator to other specified values.

Based on the foregoing, it should be appreciated that the various embodiments of the invention include a method, system, apparatus, and computer-readable medium for providing spreadsheet-based key performance indicators. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing a spreadsheet-driven key performance indicator, the method comprising:
    creating the spreadsheet-driven key performance indicator, wherein creating the spreadsheet-driven key performance indictor comprises:
        providing a location of a spreadsheet,
        providing a location of a first cell within the spreadsheet containing an indicator value, and
        providing data for obtaining a goal value, wherein providing the data for obtaining the goal value comprises providing a location of a second cell within the spreadsheet; and
    evaluating the spreadsheet-driven key performance indicator, wherein evaluating the spreadsheet-driven key performance indicator comprises:
        retrieving the indicator value from the first cell within the spreadsheet containing the indicator value,
        retrieving the goal value from the second cell at the provided location of the second cell within the spreadsheet containing the goal value
        comparing the indicator value to the goal value, and
        providing a visual indication based upon the comparison.

2. The method of claim 1, wherein providing the visual indication based upon the comparison comprises at least one of the following:
    displaying a first visual indication if the indicator value is less than the goal value, providing a second visual indication if the indicator value is greater than the goal value, and providing a third visual indication if the indicator value is equal to the goal value.

3. The method of claim 1, wherein the first cell within the spreadsheet comprises a reference to a database and wherein retrieving the indicator value comprises retrieving the indicator value from the database.

4. The method of claim 1, wherein the second cell within the spreadsheet comprises a reference to a database and wherein retrieving the goal value comprises retrieving the goal value from the database.

5. The method of claim 1, wherein the key performance indicator further comprises a warning value and wherein evaluating the key performance indicator further comprises comparing the indicator value to the warning value and providing a visual indication at least based upon an indicator-to-warning value comparison.

6. The method of claim 5, wherein the warning value is expressed as a location of a third cell within the spreadsheet, and wherein evaluating the key performance indicator further comprises retrieving a warning value from the location of the third cell within the spreadsheet.

7. The method of claim 6, wherein the third cell comprises a reference to a database and wherein retrieving the warning value comprises retrieving the warning value from the database.

8. The method of claim 5, wherein providing the visual indication based upon the indicator-to-warning value comparison comprises at least one of the following: displaying a first visual indication if the indicator value is less than the warning value, providing a second visual indication if the indicator value is greater than the warning value, and providing a third visual indication if the indicator value is equal to the warning value.

9. A computer-readable storage medium having computer-executable instructions stored thereon which, when executed by a computer, perform a method for providing a spreadsheet-driven key performance indicator, the method executed by the computer-executable instructions comprising:

receiving a request to create the spreadsheet-driven key performance indicator, wherein receiving the request to create a spreadsheet-driven key performance indicator comprises:
receiving a location of a spreadsheet,
receiving a location of a first cell within the spreadsheet containing an indicator value, and
receiving data for obtaining a goal value;
in response to receiving the request, saving a key performance indicator definition including the location of the spreadsheet, the location of the first cell within the spreadsheet containing the indicator value, and the data for obtaining the goal value;
receiving a request to evaluate the spreadsheet-driven key performance indicator; and
in response to receiving the request to evaluate the spreadsheet-driven key performance indicator, retrieving the indicator value from the first cell within the spreadsheet, obtaining the goal value based on the received data for obtaining the goal value comparing the goal value to the indicator value, and displaying a visual indication based upon results of the comparison.

10. The computer-readable storage medium of claim 9, wherein the data for obtaining the goal value comprises a number to be utilized as the goal value.

11. The computer-readable storage medium of claim 9, wherein of the first cell comprises a reference to a database and wherein retrieving the indicator value comprises retrieving the indicator value from the database.

12. The computer-readable storage medium of claim 9, wherein the data for obtaining the goal value comprises a location of a second cell within a spreadsheet from which data can be retrieved and utilized as the goal value.

13. The computer-readable storage medium of claim 12, wherein the second cell comprises a reference to a database and wherein retrieving the goal value comprises retrieving the goal value from the database.

14. The computer-readable storage medium of claim 9, wherein displaying the visual indication based upon the results of the comparison comprises at least one of the following: displaying a first visual indication if the indicator value is less than the goal value, displaying a second visual indication if the indicator value is greater than the goal value, and displaying a third visual indication if the indicator value is equal to the goal value.

15. The computer-readable storage medium of claim 9, wherein the request to create the spreadsheet-driven key performance indicator further comprises data for obtaining a warning value, and wherein the computer-readable storage medium further comprises instructions for saving the data for obtaining the warning value in the spreadsheet-driven key performance indicator definition, comparing the warning value to the indicator value in response to the request to evaluate the spreadsheet-driven key performance indicator, and displaying an additional visual indication at least based upon the results of the comparison between the indicator value and the warning value.

16. The computer-readable storage medium of claim 15, wherein the data for obtaining the warning value comprises a number to be utilized as the warning value.

17. The computer-readable storage medium of claim 15, wherein the data for obtaining the warning value comprises a location of a third cell within the spreadsheet from which data can be retrieved and utilized as the warning value.

18. The computer-readable storage medium of claim 15, wherein displaying the additional visual indication based upon the results of the comparison comprises at least one of the following: displaying a first visual indication if the indicator value is less than the warning value, displaying a second visual indication if the indicator value is greater than the warning value, and displaying a third visual indication if the indicator value is equal to the warning value.

19. A method for providing a spreadsheet-driven key performance indicator, the method comprising:

creating the spreadsheet-driven key performance indicator, wherein creating the spreadsheet-driven key performance indicator comprises:
receiving a location of a spreadsheet,
receiving a location of a first cell within the spreadsheet containing an indicator value,
receiving an indication of a goal value, wherein the indication of the goal value comprises one of the following: a numerical value and a location of a second cell within the spreadsheet utilized for the goal value, and
receiving, from a user, an indication specifying when the spreadsheet-driven key performance indicator can be calculated; and
evaluating the spreadsheet-driven key performance indicator, wherein evaluating the spreadsheet-driven key performance indicator comprises:
retrieving the indicator value from the location of the first cell within the spreadsheet containing the indicator value,
determining whether the goal value the goal value is a cell reference, if the indication of the goal value is a cell reference, retrieving the goal value from the second cell within the spreadsheet at the received location of the second cell, otherwise utilizing the received numerical value as the goal value,
comparing the indicator value to the goal value, and
providing a visual indication based upon the comparison.

* * * * *